United States Patent [19]

Kordomenos et al.

[11] Patent Number: 4,533,534

[45] Date of Patent: Aug. 6, 1985

[54] THERMOSETTING COATING COMPOSITION USEFUL AS PRIMER AND CHIP RESISTANT PRIMER II

[75] Inventors: Panagiotis I. Kordomenos, Mt. Clemens; Andrew H. Dervan, Fraser; Dennis J. Grebur, Berkley, all of Mich.

[73] Assignee: Ford Motor Company, Dearborn, Mich.

[21] Appl. No.: 564,144

[22] Filed: Dec. 22, 1983

Related U.S. Application Data

[62] Division of Ser. No. 510,799, Jul. 5, 1983.

[51] Int. Cl.³ .................. C08L 63/02; C08L 67/04
[52] U.S. Cl. .................. 523/436; 525/440; 525/450; 525/528; 525/533
[58] Field of Search ........... 525/533, 440, 450, 528; 523/436

[56] References Cited

U.S. PATENT DOCUMENTS

| | | | |
|---|---|---|---|
| 3,203,920 | 8/1965 | Nikles | 525/533 |
| 3,382,210 | 5/1968 | Wyart | 525/533 |
| 3,507,820 | 4/1970 | Maeda | 525/533 |
| 3,607,795 | 9/1971 | Nolken | 525/533 |
| 3,816,280 | 6/1974 | Watt | 525/533 |
| 3,925,504 | 12/1975 | Koleske | 525/533 |
| 4,148,772 | 4/1979 | Marchetti | 525/533 |
| 4,260,716 | 4/1981 | Christenson | 528/45 |
| 4,260,720 | 4/1981 | Bosso | 528/109 |
| 4,314,918 | 2/1982 | Birkmeyer | 525/440 |
| 4,317,894 | 3/1982 | Lewarchik | 525/450 |
| 4,322,508 | 3/1982 | Peng | 525/111 |
| 4,343,925 | 8/1982 | Chang | 525/440 |
| 4,384,103 | 5/1983 | Chattha | 525/440 |
| 4,403,093 | 9/1983 | Hartman | 525/440 |
| 4,423,168 | 12/1983 | Valko | 523/514 |
| 4,423,179 | 12/1983 | Guagliardo | 525/440 |

*Primary Examiner*—John C. Bleutge
*Assistant Examiner*—Patricia Short
*Attorney, Agent, or Firm*—Roger L. May; Keith L. Zerschling

[57] ABSTRACT

Novel epoxy-polyester graft copolymer and novel, solvent-based thermosetting coating composition comprising said copolymer and blocked polyisocyanate crosslinking agent. Coating composition may be formulated as hot sprayable, high solids coating composition suitable for use as chip resistant automotive vehicle primer adapted for use on body panel areas subject to chipping by stones, gravel and other road debris. Alternatively, composition may be formulated as a high solids composition sprayable with conventional spraying equipment. Epoxy-polyester graft copolymer is prepared by polymerization of lactone monomers in presence of hydroxy functional epoxy ester resin precursor. Precursor resin is formed by reaction of diepoxide, previously chain extended with dicarboxylic acid, with hydroxy functional secondary amine in chain terminating reaction.

24 Claims, No Drawings ized by reaction of diepoxide, which has been chain
THERMOSETTING COATING COMPOSITION USEFUL AS PRIMER AND CHIP RESISTANT PRIMER II This is a division of application Ser. No. 510,799, filed July 5, 1983.

TECHNICAL FIELD

This invention relates to a novel epoxy-polyester graft copolymer and to a novel, solvent-based, thermosetting coating composition comprising same. It relates also to such coating composition formulated, for example, as a hot sprayable, high solids coating composition suitable for use as a chip resistant automotive vehicle primer adapted for use on body panel areas subject to chipping by stones, gravel and other road debris.

BACKGROUND

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive processing modifications during painting operations. To date available primers, whether high or low solids, have not proven suitable.

In order to overcome the aforementioned chipping problem it has been common to apply relatively thick chip resistant coatings in body panel regions, which are inclined to chip, prior to application of still another primer composition. One such chip resistant sealer material which has been employed is a solvent based polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often times surface imperfections also result from the fact that a primer is applied over the top of this sealer, with the primer and sealer being cured together. As a result some solvent and plasticizer tend to be driven out of the polyvinyl chloride plastisol and result in a wavy and rough surface. Still further problems associated with the use of such polyvinyl chloride plastisol sealers and the like involve application technique. Since the polyvinyl chloride plastisol sealers and the like must be applied in thicknesses of 20 mils or greater in order to obtain good adhesion, they cannot be feathered down to blend in with other regions of the sheet metal which do not require the additional chip protection. Thus, the materials must be applied using a masking technique whereby those regions which are not to be coated with the sealer material are masked in a separate operation prior to application of sealer. This masking is then removed after the sealer is applied. It would obviously be desirable to eliminate these additional steps in the application of the chip resistant sealer material.

Still further, many high solids coating compositions, in particular prior art epoxy ester amino resin primers, exhibit poor package stability, especially in the presence of corrosion inhibiting pigments such as zinc chromate. Accordingly, it would be highly desirable to provide a coating composition comprising low molecular weight materials suitable for use in high solids, solvent based coating compositions and yet which, not only exhibits good package or shelf stability even in the presence of corrosion inhibiting pigments, but also, upon curing, forms coatings having physical properties comparable to those obtained from conventional low solids solvent-based coating compositions.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend with paint in other areas of the substrate to be painted which do not require chip resistant coating.

It is a further object of the present invention to provide novel resins suitable for use in solvent-based thermosetting coating compositions. In this regard, it is a particular object of the invention to provide novel, epoxy-polyester graft copolymer resins which are crosslinkable during cure, on the surface of a substrate.

It is another object of the invention to provide novel coating compositions which comprise crosslinkable epoxy-polyester graft copolymers and blocked polyisocyanate crosslinking agent and which provide high crosslinking efficiency and hard, well cured films at minimum bake temperatures such as applied to automotive primers. In this regard, it is a particular object of the invention to provide a novel epoxy-polyester/-blocked polyisocyanate thermosetting coating composition of sufficiently low VOC to meet governmental guidelines and yet which can be applied to a substrate by spraying or other known method.

It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, novel crosslinkable epoxy-polyester graft copolymer resins are provided which are adapted for use in thermosetting coating compositions, and which are especially advantageous for use in high solids and chip resistant, organic solvent based thermosetting coating compositions. The epoxy-polyester graft copolymer resins of the invention preferably have a number average molecular weight (Mn) of about 2,000 to about 20,000 and are prepared by polymerization of lactone monomers in the presence of hydroxy functional epoxy ester resin precursor preferably having a number average molecular weight (Mn) of between about 1,000 and about 4,000 and itself being formed by reaction of diepoxide, which has been chain extended with dicarboxylic acid, with hydroxy functional secondary amine in chain terminating reaction.

Also according to the present invention, a novel, organic solvent based, thermosetting resin/crosslinking agent composition, in addition to solvent and any pigments and additives such as, for example, catalyst, flow control agents and the like, comprises the epoxy-polyester graft copolymer resin of the invention and blocked polyisocyanate crosslinking agent including, but not limited to, blocked trifunctional isocyanurate ring containing polyisocyanates and oligoester modified blocked isocyanates.

Particularly preferred compositions of the invention are those formulated as high solids coating compositions having solids levels in the range of 65-80% solids and which are applied as chip resistant primers in those areas of automotive panels, such as rocker panels, which are exposed to high levels of chipping. Such compositions may be applied in thicknesses ranging from 1 to 25 mils wet to obtain final coatings in the range of 1 to 12 mils dry, and may be feathered down to blend in with paint applied to regions outside that requiring additional chip resistance protection. Generally, the compositions of this solids level may be applied using hot spray equipment at temperatures in the range of 140°-160° F.

Other preferred compositions of the invention are those formulated as high solids coating compositions adapted to be applied by conventional spraying onto a substrate. These high solids coating compositions may have a solids level in the range of 50-60% and are especially useful as a primer coating on the bare, unpolished metal surface of an automotive vehicle. As used herein, a high solids coating composition is one having a volatile organic content of about 479 g/l (4.0 lb./gal.) or less.

Other features and advantages of this invention will become more apparent from the following, detailed description thereof including the preferred embodiments and best mode of carrying out this invention.

DETAILED DESCRIPTION OF THE INVENTION

More specifically, the invention relates to a novel epoxy-polyester graft copolymer adapted for use in a thermosetting composition and to a thermosetting composition comprising that graft copolymer and a blocked polyisocyanate crosslinking agent.

The novel, epoxy-polyester graft copolymer preferably has a number average molecular weight (Mn) of between about 2,000 and about 20,000 and is formed by polymerization of lactone monomers in the presence of hydroxy functional epoxy ester resin precursor preferably having a number average molecular weight (Mn) of between about 1,000 and about 4,000. The hydroxy functional epoxy ester resin precursor is formed by reacting diepoxide, which has been chain extended with dicarboxylic acid, with hydroxy functional secondary amine in chain terminating reaction in approximately 1 to 1 equivalent ratio. The polymerization of lactone monomers with the precursors is generally carried out at a temperature between about 130° C. and about 200° C. and the polymerization reaction mixture preferably comprises between about 10 and about 80 weight percent said hydroxy functional epoxy ester resin precursor and between about 20 and about 90 weight percent said lactone monomers.

Thermosetting compositions of the invention comprise the above graft copolymer and blocked polyisocyanate crosslinking agent comprising at least one isocyanate group which has been blocked by reaction with an active hydrogen bearing blocking agent. The blocked polyisocyanate crosslinking agent is included in the composition in an amount such that upon deblocking of the blocked isocyanate groups thereof at the cure temperature of the composition, the crosslinking agent provides between about 0.5 and about 1.6 reactive isocyanate groups per reactive group on the epoxy-polyester graft copolymer.

Each of the above major components of the compositions as well as other components and other aspects of the invention are described hereinafter in greater detail.

A. Epoxy Polyester Graft Copolymer

As described above this copolymer is prepared by polymerizing lactone monomer in the presence of an hydroxy functional epoxy ester resin precursor formed by reacting diepoxide, which has been chain extended with dicarboxylic acid, with hydroxy functional secondary amine in chain terminating reaction.

It is believed to be a significant characterizing aspect of the epoxy-polyester graft copolymer of the invention that the polymerized lactone portion of the epoxy-polyester graft copolymer gives the polymer flexibility as well as toughness, two key properties when choosing a primer for use in areas susceptible to chipping. It is a further characterizing aspect of the copolymer that it includes epoxy resin portions, i.e. hydroxyl terminated epoxy ester resin precursor is used as an initiator to form the graft copolymer, which give the copolymer excellent corrosion resistance properties. Still further, because the graft copolymers of the invention are branched they require a minimum amount of crosslinking in order to obtain a suitable network for good coating integrity. Since crosslink bonds, e.g. isocyanate bonds as used in compositions of the invention, tend to be somewhat brittle, it is desirable to keep the number of such bonds to a minimum. Even still further it is a characterizing aspect of the invention that the graft copolymer contains tertiary amine groups (i.e., since hydroxy functional secondary amines are used to form the hydroxy functional epoxy ester resin precursor, tertiary amine groups are present in the final copolymer). Tertiary amine groups are excellent catalysts for the isocyanate crosslinking reaction used to cure compositions of this invention.

Preferred epoxy-polyester graft copolymers of the invention include significant aromatic content which is believed to enhance corrosion resistance properties. Even though aromatics tend to increase the brittleness of polymers and compositions including such polymers, it is possible to include them since, as mentioned above, the polymerized lactone portion of the epoxy-polyester graft copolymer gives the polymer increased flexibility which more than compensates for any such brittleness. A particularly preferred embodiment of the epoxy-polyester graft copolymer resin of the invention is prepared from aromatic containing diepoxide. Also, as discussed hereinafter, the dicarboxylic acid reactant employed in preparation of the epoxy-ester resin precursor may also include aromatic units.

Each of the reactants employed in the preparation of the epoxy-polyester graft copolymer is described in greater detail below.

(i) Chain Extended Diepoxide Reactant

The chain extended diepoxide reactant employed in the manufacture of the hydroxy functional epoxy ester resin precursor is prepared by chain extension of diepoxide with dicarboxylic acid. While, ultimately, the choice of dicarboxylic acid chain extended epoxy reactant for preparing the epoxy ester precursor resin will depend to an extent upon the particular application intended for the coating composition, terminal diepoxides, that is chain extended diepoxides bearing two terminal epoxide groups, are generally most preferred. These are generally more reactive and therefore require reaction conditions under which undesirable side reactions, for example, epoxy-epoxy reactions and gellation, can be more easily avoided. Preferably, the chain extended diepoxide has a number average molecular weight (Mn) between about 1,000 and about 3,500, and more preferably between about 1,500 and about 2,500. The diepoxides which are to be chain extended with dicarboxylic acid may be selected from numerous diepoxides, some of which may be diphenol extended diepoxides.

Numerous diepoxides previously extended with diphenol are commercially available. These include certain of the well known bisphenol-A epichlorohydrin epoxy resins of the Epon (trademark) series, Shell Chemical Company, Houston, Tex., (e.g. Epon 1000 and Epon 1004) and the DER (trademark) series, Dow Chemical Company, Midland, Mich. These diglycidyl ether bisphenol-A resins or higher molecular weight analogs thereof, are most preferred in view of their cost and commercial availability.

Other diepoxy resins, not previously extended with diphenol, may be extended with dicarboxylic acid and used in the preparation of the hydroxy functional epoxy ester resin precursor. Preferred diepoxy resins of this type include: Epon 828 (trademark) and Epon 829 (trademark), which are non-extended diepoxides of the aforementioned Epon Series, as well as cycloaliphatic diepoxy resins, such as the Eponex (trademark) series, Shell Chemical Company, Houston, Tex.; hydantoin epoxy resins such as, for example, Resin XB2793 (trademark), Ciba-Geigy Corporation, Ardsley, N.Y.; and any of a wide variety of acyclic or cyclic aliphatic diepoxides such as, for example, 1,4-butanediol diglycidyl ether and 4-vinyl-cyclohexene dioxide and the like.

Still other suitable diepoxides which may be chain extended with dicarboxylic acid and used in synthesizing the epoxy-ester resin precursor are commercially available and will be apparent to the skilled of the art in view of the present disclosure. Also, it will be understood from the foregoing that any mixture of compatible diepoxides may be used.

Dicarboxylic acids suitable for chain extending diepoxides discussed above preferably have a number average molecular weight of between about 145 and about 1000 and more preferably between about 400 and about 600. Suitable dicarboxylic acids includes numerous commercially available materials, many of which will be readily apparent to the skilled of the art in view of the present disclosure. Suitable dicarboxylic acids include saturated or unsaturated, cyclic or acyclic, aliphatic or aromatic dicarboxylic acids or a mixture thereof. Acyclic aliphatic dicarboxylic acids are generally preferred in view of the enhanced flexibility they provide to the cured coatings of the invention. Preferred dicarboxylic acids have the general formula (I):

HOOC—R—COOH  (I)

wherein R is a divalent linking moiety substantially unreactive with the diepoxide resin. It will be apparent to the skilled of the art in view of the present disclosure, that R should be subtantially unreactive also with the hydroxy functional secondary amine employed in preparation of the epoxy ester resin precursor, and with hydroxy functionality (generated in the chain-extension reaction). Preferably R is a divalent, organic, linking moiety. Particularly preferred are those dicarboxylic acids wherein R is selected, from the group comprising a straight or branched alkylene or alkylidene moiety, preferably of about 4-42 carbons, for example, $(CH_2)_n$ wherein n is preferably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably excellent flexibility and corrosion protection.

Exemplary dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. The anhydrides of these acids, where the anhydrides exist, are, of course, embraced in the term "acid" since the reaction products obtained therefrom are the same. While dicarboxylic acids according to formula (I) can be used, wherein R is an alkylene chain of less than 4 carbons, for example, oxalic acid, malonic acid, succinic acid, glutaric acid and the like, these are less preferred in view of the somewhat lesser degree of flexibility provided thereby. Preferably the dicarboxylic acid provides two terminal carboxyl groups. Similarly, preferred aromatic dicarboxylic acids are those wherein the carboxylic groups are more spaced apart, for example, 1,4-benzenedicarboxylic acid and 2,7-naphthalenedicarboxylic acid.

The most preferred dicarboxylic acids are subtantially saturated, acyclic, aliphatic dimer acids, which are well known to the skilled of the art and readily commercially available. These are typically the dimerization reaction products of fatty acids which have from 4 to 22 carbons and a terminal carboxyl group. Of these, dimer acid of 36 carbons is most preferred since it provides excellent reactivity with the preferred diepoxides described above, provides epoxy ester reaction products of advantageously wide molecular weight distribution, and provides, ultimately, cured coatings of the invention having excellent physical properties. In addition, dimer acid of 36 carbons is readily commercially available, for example, as Empol 1014 (trademark), Empol 1016 (trademark) and Empol 1018 (trademark), each available from Emery Industries, Inc., Cincinnati, Ohio. It should be recognized that most or all commercially available dimer acids contain some portion of trimer acid, typically, for example, about 5–10% but in some cases as much as 30% or more, and also contain a usually smaller portion of monocarboxylic acid. As used herein, the term "dimer acid" includes those containing such amounts of these materials. Most useful is the present compositions are products that contain mostly dibasic acid and none or low amounts of tribasic and monobasic acids.

Aliphatic dicarboxylic acids are seen to provide additional advantages. In particular, while not wishing to be bound by theory, it is presently understood that epoxy-polyester resin graft copolymers prepared from epoxy ester resin precursors derived therefrom wet the substrate surface better and provide enhanced adhesion between the substrate and the cured coating. They also flow better and, thus, provide an excellent smooth surface upon being cured. Also, the aliphatic units provide enhanced flexibility to the cured coating, as noted above, and this flexibility of the coating is seen to provide enhanced impact resistance, a feature even more highly desirable for chip resistant coating embodiments.

Where corrosion protection for the substrate is important, it may be preferred to employ dicarboxylic acid according to formula (I) above, wherein R is, at least in part, aromatic. As noted above, it is believed that such aromatics in the coating composition of the invention, such as a primer composition for a metal substrate, are more resistant to hydrolysis than are aliphatics and, therefore, provide enhanced corrosion and moisture resistance. Of course, as also noted above, according to preferred embodiments of the epoxy ester resin precursor, described above, the diepoxide reactant provides aromatic units to the resin and this would similarly contribute to corrosion and moisture resistance.

Other suitable dicarboxylic acids for the epoxy ester resin of the present invention will be apparent to the skilled of the art in view of the present disclosure.

(ii) Hydroxy Functional Secondary Amine Reactant

The hydroxy functional secondary amine which is reacted in chain terminating reaction with the reaction product of the above described diepoxide and dicarboxylic acid may be selected from a broad chain of aliphatic, cycloaliphatic and aromatic hydroxy functional amines.

Numerous such amines, which may bear mono- or dihydroxy functionality will be apparent to those skilled in the art. Exemplary of such amines are those having the formula

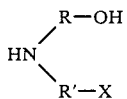

wherein R and R' are selected from the group consisting of aliphatic, cycloaliphatic and aromatic radicals which will not interfere with either the chain termination reaction between the chain extended diepoxide and the hydroxy functional secondary amine or the polymerization of lactone monomers in the presence of the hydroxy functional epoxy ester resin precursor.

R and R' in the above formula may be the same or different, but preferably should be of the same nature. X may be selected from hydrogen and hydroxyl radical.

While the hydroxyl group on R and/or R' may be other than primary, primary hydroxyls are preferred since such primary hydroxyl groups provide preferred reaction sites for polymerization of lactone monomer. If secondary hydroxyl group bearing amines are employed, for example, polymerization of lactone at the ends of the precursor would not necessarily be predominant as preferred since there will be secondary hydroxyls present on the extended diepoxide which will compete with the terminal hydroxyls to initiate lactone polymerization. Even in those cases where primary hydroxyl is present on the amine, lactone monomers will polymerize at hydroxyl sites other than those at the ends of the amine terminated precursor. Up to 20% or more would not be unexpected.

Examples of preferred radicals R and R' for the hydroxy functional amine of the above formula are:

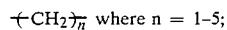

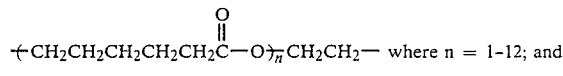

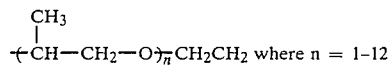

Preferably R and R' are methylene, ethylene, or lower alkylene groups but they may be any other noninterfering radical including those, for example, such as benzyl, oxyalkylene, etc.

Particularly preferred primary hydroxyl bearing amines for use in preparing the hydroxy functional epoxy ester precursor are diethanol amine, methylethaol amine, dipropanol amine and methylpropanol amine.

The hydroxy functional epoxy ester resin precursor used to initiate lactone polymerization in the preparation of the epoxy-polyester graft copolymer of the invention can be made according to techniques well known to the skilled of the art. The chain extension and chain termination reactions occur sequentially, with the chain extension of the diepoxide being carried out first. Diepoxide and dicarboxylic acid are charged into a suitable reactor and heated. it should be recognized that to assure rapid and/or more complete reaction of the diepoxide with the dicarboxylic acid functionality, it is usually preferred to have a catalyst present. The use of catalyst, however, has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commercially available and include, any of the well known catalysts for epoxy-dicarboxylic acid reactions such as, for example, sodium carbonate which is preferred, and lithium neodecanoate, lithium naphthenate, lithium nanoate, other known organometallic catalysts and tertiary amine catalysts and the like or a compatible mixture of any of them. Others will be apparent to the skilled of the art in view of the present disclosure. The reaction mixture is heated to at least about 140° C. (250° F.), when in the presence of catalyst, exothermic reaction will proceed with or without further heating. Typically, the reaction mixture will then read about 149° C.–176° C. (300° F.–350° F.), depending upon the batch size and reactor vessel insulation, etc. In the absence of catalyst, such exotherm is typically not observed and continued heating is required. The progress of the reaction can be followed by acid number measurements and/or WPE.

The diepoxide and dicarboxylic acid are generally reacted in relative proportions of 1:0.5 to 0.8 equivalents respectively. More preferably relative proportions are one equivalent of epoxy functionality to 0.5 to 0.6 equivalents of dicarboxylic acid functionality.

After completion of the above chain extension reaction the hydroxy functional secondary amine reacted is charged into the reaction vessel. The reaction is exothermic and drives itself to completion.

As noted above, the chain extended reaction product is reacted with the hydroxy functional secondary amine in chain terminating reaction in approximately 1 to 1 equivalent ratio. This ratio is desirable since excess epoxy could result in gelation of the reaction mixture, which excess amine remaining in the reaction mixture could compete with epoxy ester resin precursor for lactone monomers during formation of the epoxy-polyester graft copolymer. For this reason, if excess amine is used during formation of the precursor, it should preferably be removed prior to reaction of the precursor with lactone monomers.

(iii) Lactone Monomers

The lactone reactant may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as a reactant can be represented by the general formula:

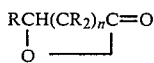

in which n is at least four, for example, from four to six, at least n+2 R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

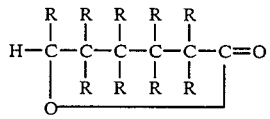

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid and is most preferred. Substituted epsilon-caprolactones, and mixtures thereof, are available by reacting a corresponding substituted cyclohexanone with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not distributed; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized in accordance with the method of the invention.

Polymerization of the lactones in accordance with this invention is carried out in conventional manner in that the polymerization is initiated by reaction with a compound having at least one reactive hydrogen capable, with or without the aid of a catalyst, by opening the lactone ring and adding it as an open chain without forming water of condensation—in this case the initiator compound being the hydroxy functional epoxy ester precursor described above.

To initiate and continue the polymerization of the lactone, the lactone and the initiator (i.e., the precursor) are preferably heated to a temperature between about 130° and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50° to 300° C., is considered operable and a more limited range between about 130° and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, caseium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The epoxy polyester graft polymerization products obtained in accordance with the invention have molecular weights generally upwards of about 2,000 and preferably within the range of about 4,000 to about 20,000, although molecular weights below and substantially above this range are obtainable if desired. They also have reactive terminal hydroxyl or carboxyl groups, the number of reactive terminal groups depending upon the functionality of the initiator. They are characterized by the presence of series of interconnected, substantially linear units or groups composed of carbon, hydrogen and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at one end of the series.

B. Crosslinking Agent

The crosslinking agent employed in the novel solvent based coating compositions of the invention comprises blocked polyisocyanate. The novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanato groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanato groups are present. The blocking agent may be represented by the formula BH and may be selected from numerous materials, hereinafter discussed, which bear an active hydrogen.

The blocked polyisocyanate crosslinking agent is included in compositions of the invention in amounts such that upon deblocking of the blocked isocyanato groups at the cure temperature of the composition, the crosslinking agent will provide between about 0.5 and about 1.6, preferably between about 0.8 and about 1.3, reactive isocyanato groups per reactive group on the film forming resin of the coating composition as described above. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glycosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

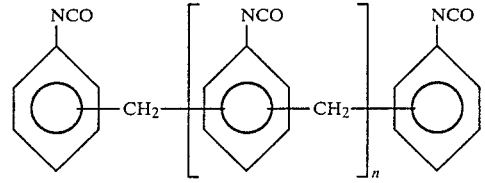

wherein n equals 1 to 3. The compounds, sold under the tradename "PAPI" by the Upjohn Chemical Company of Kalamazoo, Mich., have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amines and propanol amine. Suitable oxime blocking agents include, for example, methylethylketone oxime, acetone oxime and cyclohexanone oxime. Examples of lactams which may be used as blocking agents are -caprolactam, -butyrolactam and pyrrolidone, while suitable triazoles include compounds such as 1,2,4 triazole, 1,2,3 benzotriazole, 1,2,3 tolyl triazole and 4,5 diphenyl-1,2,3 triazole. Particularly preferred active hydrogen containing blocking agents are methylethyl ketoxime and 2-ethyl-hexanol.

(i) Isocyanurate Ring Containing Blocked Isocyanate Compounds

Within the scope of the above general class of blocked polyisocyanate crosslinking agents, a particular class type of blocked polyisocyanate crosslinking agent which may be employed in the novel solvent based coating compositions of the invention comprises isocyanurate ring containing blocked isocyanate compounds. In general, these blocked polyisocyanates may be formed by blocking with the aforementioned blocking agent isocyanurate ring containing polyisocyanates. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particular desirable blocked polyisocyanate crosslinking agent is the blocked form of the pure trifunctional isocyanurate represented by the following formula:

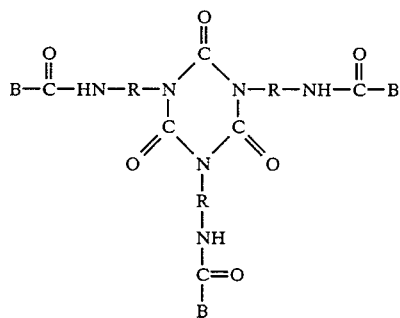

wherein R is selected from the group consisting of aliphatic, cycloaliphatic and aromatic groups and combinations thereof and B is the residue of an active hydrogen containing blocking agent. More specifically, this compound is disclosed in copending application Ser. No. 368,178 filed Apr. 14, 1982, the disclosure of which is incorporated herein by reference.

(ii) Oligoester Modified Blocked Polyisocyanates

Still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanato group more reactive than the other, with the more reactive isocyanato first being blocked with a blocking agent and the remaining isocyanato group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight (Mn) of between about 150 and about 3000, preferably between about 230 and about 1000, (i) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;
(b) the esterification reaction product of polyepoxide, i.e., a compound having 2 or more epoxide groups, and monocarboxylic acid, preferably containing no ethylenic unsaturation, and bearing no hydroxy functionality;
(c) the esterification reaction product of hydroxy functional carboxylic acid and mono- or polyepoxide, preferably monoepoxide;
(d) the esterification reaction product of monocarboxylic acid and hydroxy functional mono- or polyepoxide, preferably monoepoxide; and
(e) mixtures of (a)-(d).

As noted above, the first type of oligoester modified blocked polyisocyanate crosslinking agent is prepared by (i) reacting organic diisocyanate bearing one isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic; therefore, the diisocyanate and the blocking agent are preferably admixed at temperatures no higher than about 80° C., preferably below about 50° C., to minimize the exothermic effect.

This intermediate is next reacted with the oligoester diol or triol described above so as to react substantially all free or unblocked isocyanato groups of the diisocyanate/blocking agent intermediate with hydroxyl groups of the oligoester. This reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resultant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

C. General Discussion-Other Aspects of Invention and Other Components

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferrably, the cured coating is substantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65–80%. Such higher solids materials are generally applied using hot spray equipment.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents. Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, CT. 06852; Bentone (trademark) 38 N. L. Industries, Highstown, N.J. 08520; and Cab-O-Sil (trademark) M-5, Cabot Corporation.

Curing the coating composition requires baking for sufficient time at sufficiently elevated temperature to react the crosslinking agent with the hydroxyl functionality of the epoxy polyester graft copolymer. The time and temperature required to cure the coating are interrelated and depend upon the particular epoxy polyester resin, crosslinking agent, solvent and other materials, if any, and the amount of each comprising the coating composition. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable epoxy polyester graft copolymer resins of the invention, especially the preferred resins described above and blocked polyisocyanate crosslinking agent, especially the preferred materials described above have been found to afford cured coatings with improved corrosion resistance and chip resistance, thus representing a highly advantageous advance in the art.

A most preferred use of the coating composition of the invention is as a high solids hot sprayable chip resistant primer for use on a bare metal substrate such as an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be as much as 0.5/1 to 2/1 by weight, respectively; it is preferred, however, to use a primer having a pigment-to-binder ratio of about 1:1–1.5:1 by weight, respectively.

In preferred embodiments of this invention pigments and thixotropic agents desireably are dispersed with epoxy ester resins which do not have an elastomeric component as does the epoxy-polyester graft copolymer employed as the primery film forming resin of the compositions. It has been found that in addition to being very effectice dispersing agents for the preparation of pigment millbases and thixotropic dispersions, non-elastomeric epoxies give the compositions toughness. One type of epoxy useful for this purpose comprises the reaction product of diepoxide, dimer acid and a mixture of soya fatty acid and propionic acid (See Example 6). Other epoxy ester resins useful for this purpose are those disclosed in copending application Ser. Nos. 448,886 filed June 14, 1982, 431,465 filed Sept. 30, 1982 and 420,182 filed Sept. 30, 1982. all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thixotropic agents will be apparent to the skilled of the art.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed on to the metal base and cured. The primer is applied in greater thickness of 1 to 25 mils wet, preferably 10 to 25 mils wet, in order to obtain final coatings in the desired range of 5-11 mils in regions highly susceptible to chipping and is then feathered down in thickness to the thickness of paints in areas not receiving a chip resistant primer. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

Preparation of Epoxy-Polyester Graft Copolymer

Into a suitable reactor were charged 519 parts Epon 829 and 512 parts Empol 1016. The temperature of the mixture was brought up to about 180° C. at which point an exothermic reaction took place that raised the temperature to about 200° C. After one hour, the acid number was found to be zero; the mixture was cooled to about 150° C. 92 parts diethanolamine and 400 parts Solvesso 100 were added to the mixture at which point a mild exothermic reaction took place that raised the temperature to about 150° C. After one hour, 1684 parts epsilon-caprolactone and 7 parts dibutyltin oxide were charged to the mixture; a mild exothermic reaction took place that raised the temperature to about 130° C. The progress of the reaction was followed by viscosity measurement; the reaction was stopped at M-T viscosity (25 parts mixture and 15 parts xylene producing a 50.0% solids solution). At that point, 800 parts M-pyrol were added and the mixture was allowed to cool. The resulting resin had a $Z_5$ viscosity at 70.0% solids.

EXAMPLE 2

Preparation of Epoxy-Polyester Graft Copolymer

Into a suitable reactor were charged 519 parts Epon 829, 512 parts Empol 1014, and 2589 parts Solvesso 100. The temperature of the mixture was brought up to 150°–1600° C. After one hour at this temperature, the acid number was found to be zero. 142 parts Solvesso 100 and 92 parts diethanolamine were added to the mixture at which point a mild exothermic reaction occurred and the temperature rose to about 150° C. 1684 parts epsilon-caprolactone and 7 parts dibutyltin oxide were charged; a second mild exotherm took place that raised the temperature to 120° C. The progress of the reaction was followed by viscosity measurement; the reaction was stopped at M-T viscosity (25 parts mixture with 15 parts xylene producing a 50.0% N.V. solution). At that point, heating was removed and 500 parts M-pyrol were added and the mixture was allowed to cool. The resulting resin had a $Z_4$ viscosity at 70% solids.

EXAMPLE 3

Preparation of Epoxy-Polyester Graft Copolymer

Into a suitable reactor were charged 350 parts Epon 829 and 345 parts Empol 1016. The temperature of this mixture was brought up to about 160° C.; after one hour at this temperature, the acid number was found to be zero. 460 parts Solvesso 100 and 465 parts N-methylethanolamine were added to the mixture at which point a mild exothermic reaction occurred and the temperature rose to about 150° C. After one hour, 1,110 parts epsilon-caprolactone and 6 parts dibutyltin oxide were added to the mixture; a second mild exotherm took place that raised the temperature to about 120° C. The progress of the reaction was followed by viscosity measurement, the reaction was stopped at M-T viscosity (25 parts mixture with 15 parts xylene producing a 50.0% solids solution). At that point, heating was terminated and 252 parts Solvesso 100 and 80 parts M-pyrol were added; the mixture was allowed to cool. The resin had a $Z_{4\frac{1}{2}}$ viscosity at 70.0% solids.

EXAMPLE 4

Preparation of Epoxy-Polyester Graft Copolymer

Into a suitable reactor were charged 350 parts Epon 829 and 113 parts of azelaic acid. The temperature of the mixture was brought up to about 160° C.; after one hour at this temperature, the acid was found to be zero. 46 parts of Solvesso 100 and 46.5 parts of N-methylethanolamine were added to the mixture at which point a mild exothermic reaction occurred and the temperature rose to about 150° C. After one hour, 1189 parts of epsilon-caprolactone and 6 parts dibutyltin oxide were added to the mixture; at this point an exothermic reaction brought the temperature up to 120° C. The progress of the reaction was topped at M viscosity (50.0% N.V. in xylene). At this point, heating was stopped and 680 parts of M-pyrol were added. The resin had a $Z_4$ viscosity at 70.0% N.V.

EXAMPLE 5

Preparation of Epoxy-Polyester Graft Copolymer

Into a suitable reactor were charged 355 parts of Araldite RD-2 (1,4-butanediol diglycidyl ether available from Ciba-Geigy), 206 parts of dodeionedioic acid, 1 part of sodium carbonate and 250 parts of Solvesso 100. The temperature of this mixture was brought up to 160° C. After two hours at this temperature the acid number of the mixture was found to be less than one. 150 parts of Solvesso 100 and 92 parts of diethanolamine were added to the mixture at which point a mild exothermic reaction occurred and the temperature rose to about 150° C. After one hour 563 parts epsilon-caprolactone and 7 parts of dibutyltin dioxide were charged and the temperature was kept at 120° C. The progress of the reaction was followed by viscosity measurements and was stopped at M viscosity (50.0% NV in xylene). The reaction mixture was thinned with 82 parts of M-pyrol.

EXAMPLE 6

Preparation of Epoxy-Ester Dispersing Resin

Into a suitable reactor were charged 1380 parts Epon 829, 954 parts Empol 1016, 364 parts soya fatty acid, 268 parts 2,2 bis (hydroxymethyl) propionic acid, and 13 parts lithium neodeconoate. The temperature of the mixture was brought up to about 180° C., at which point an exothermic reaction took place that raised the temperature to about 200° C. After one hour, the acid number was found to be less than 2. 940 parts Solvesso 100 and 305 parts Solvesso 150 were added, and the mixture was cooled. The resin had a viscosity of $Z_7$ at 70.0% N.V.

EXAMPLE 7

Preparation of Blocked Polyisocyanate Crosslinking Agent

Into a suitable reactor were charged 1330 parts PAPI 127. 870 parts methylethyl ketoxime was added to the mixture over 2 hours. The mixture temperature rose from room temperature to 85°-95° C. After 30 minutes, the mixture was checked to insure complete reactoin of the isocyanate by infrared. If residual isocyanate was detected, additional methylethyl ketoxime could be added to mixture. At that point, 300 parts cellosolve acetate and 400 parts methylamyl ketone was added, and the mixture was cooled.

EXAMPLE 8

Preparation of Blocked Polyisocyanate Crosslinking Agent

Into suitable reactor was charged 537 parts methylethyl ketoxime. 784 parts PAPI 94 was added dropwise over two hours; the reaction temperature rose from room temperature to 80°-95° C. After 30 minutes, the mixture was checked to insure complete reaction of the isocyanate by infrared. If residual isocyanate wad detected, additional methylethyl ketoxime could be added to mixture. At that point, 300 parts methylamyl ketone and 150 parts M-pyrol were added and the mixture was cooled.

EXAMPLES 9-12

Preparation of Blocked Polyisocyanate Crosslinking Agent

Blocked isocyanate crosslinkers according to the invention were prepared in the manner of Example 8. The components employed are shown in the table below.

| Composition | Example 9 | 10 | 11 | 12 |
|---|---|---|---|---|
| L-2291 A* | 360 | 360 | 360 | |
| Desmodur IL* | 525 | | | |
| methyl amyl ketoxime | 174 | | | 87 |
| benzotriazole | | 238 | | |
| epsilon-caprolactum | | | 227 | |
| N—methyl pyrolidone | 133 | 150 | 195 | 461 |
| % NV | 80 | 80.1 | 75.1 | 57 |
| Viscosity | $Z_1$ | $Z_6$ | $Z_2$ | Z |

*Trademarks of Mobay Chemical Co.; L-2291 A is a biurette of hexamethylene diisocyanate; Desmodure IL is a polyisocyanate of tolylene diisocyanate.

EXAMPLE 13

Millbase Preparation

In a one gallon can or ballmill were charged the following materials and one quart of diagonal shot. The mixture was placed on a roller mill for 16–24 hours to reach a 7+ hegman dispersion. At that point, the letdown was added, and the mixture was run an additional hour on the roller mill.

|  | | |
|---|---|---|
| | Hi-Sol #3* | 585 |
| | 2-Ethyl Hexanol | 95 |
| | Polyethylene Wax | 70 |
| | Anti-Terra-U** | 40 |
| | Example 6 | 103 |
| | Barytes | 2259 |
| | TiO$_2$ | 429 |
| | Carbon Black | 29 |
| | Strontium Chromate | 143 |
| Letdown: | Resin of Example 6 | 247 |

*Trademark of Ashland Chemical Co., Columbus, Ohio; Hi-Sol #3 is an aromatic solvent.
**Trademark of Byk Mallinckrodt, Wallingford, CT 06492; Anti-Terra-U is an antisettling and wetting agent.

EXAMPLE 14

Bentone Gel Preparation

To a clean Ball Mill, charge the following:

|  | Parts |
|---|---|
| Solvesso 150 | 513 |
| Propylene Carbonate | 13 |
| Bentone 38 | 30 |
| Grind 30 mintues, then add: | 384 |
| Grind Resin Example 6 | |
| Grind approximately 2 Hrs. to 8 Hegman | |
| Letdown with: | 60 |
| Hi-Sol #3 | |
|  | 1000 |

Coating Compositions

| Composition | Example 15 | 16 | 17 | 18 | 19 | 20 |
|---|---|---|---|---|---|---|
| Resin of Example 1 | 2446 | | | | | |
| Resin of Example 2 | | 2446 | 2446 | | | |
| Resin of Example 3 | | | | 2446 | | |
| Resin of Example 4 | | | | | 2446 | |
| Resin of Example 5 | | | | | | 2015 |
| Millbase of Example 13 | 5788 | 5788 | 5788 | 5788 | 5788 | 5788 |
| Bertone Gel of Example 14 | 2315 | 2315 | 2315 | 2315 | 2315 | 2315 |
| Crosslinker of Example 7 | 984 | 984 | | 984 | 984 | 984 |
| Crosslinker of Example 8 | | | 1050 | | | |
| Dislon (trademark) | 114 | 114 | 120 | 120 | — | 120 |
| Cab-O-Sil (trademark) | 142 | 142 | 120 | | | |

The coating compositions were prepared by sequential mixing in a 5 gallon working capacity EMCO Proto-Lab SW Mill (trademark), Epworth Mfg. Co., South Haven, Mich., set at 900 rpm. Resin and Dislon were first mixed for approximately 10 minutes and then millbase, Bentone gel and crosslinker were added sequentially while mixing. Finally Cab-O-Sill was added and the composition mixed until a graind of 6+ on the Hegman acale was obtained.

The above compositions were sprayed at 140°–160° C. using hot-spray equipment commercially available from Nordson Corp. Unpolished Bonderite steel panels were sprayed and baked at 135° C. for 20 minutes. The thickness of the coating tested varied from 5 mils to 12 mils. The panels were top-coated with white enamel and tested for chip resistance using 10 pts. of gravel in the gravelometer test. All the above compositions exhibited excellent chip resistance. In addition, panels were tested for corrosion resistance (500 hrs. salt spray test, scribed panels) and humidity resistance with excellent results.

Additional coating compositions according to the invention are shown below.

| Composition | Example 21 | 22 | 23 | 24 |
|---|---|---|---|---|
| Resin-Ex. 4 | 2446 | 2446 | 2446 | 2446 |
| Millbase-Ex. 13 | 5788 | 5788 | 5788 | 5788 |
| Millbase-Ex. 14 | 2315 | 2315 | 2315 | 2315 |
| X-linker-Ex. 9 | 922 | | | |
| X-linker-Ex. 10 | | 922 | | |
| X-linker-Ex. 11 | | | 984 | |
| X-linker-Ex. 12 | | | | 1294 |
| Dislon | 100 | 100 | 100 | 100 |

In view of this disclosure, many modifications of this invention will be apparent to those skilled in the art. It is intended that all such apparent modifications fall within the true scope of this invention and be included within the terms of this appended claims.

Industrial Applicability

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

What is claimed is:

1. A novel, organic solvent based, thermosetting coating composition comprising:
   I. Epoxy-polyester graft copolymer having a number average molecular weight (Mn) of between about 2,000 and about 20,000, said copolymer being prepared by polymerization of lactone monomers in the presence of hydroxy functional epoxy ester resin precursor having a number average molecular weight (Mn) of between about 1,000 and about 4,000 and being formed by reacting diepoxide, which has been chain extended with dicarboxylic acid, with hydroxy functional secondary amine in chain terminating reaction in approximately 1 to 1 equivalent ratio wherein said polymerization of said lactone monomers is carried out at a temperature between about 130° C. and about 200° C. and the polymerization reaction mixture comprises between about 10 and about 80 weight percent said hydroxy functional epoxy ester resin precursor and between about 20 and about 90 weight percent said lactone monomers; and
   II. Blocked polyisocyanate crosslinking agent comprising at least one isocyanate group which has been blocked by reaction with an active hydrogen bearing blocking agent, said blocked polyisocyanate crosslinking agent being included in an amount such that upon de-blocking of the blocked isocyanate groups thereof at the cure temperature of the composition, said crosslinking agent will provide between about 0.5 and about 1.6 reactive isocyanate groups per reactive group on said epoxy-polyester graft copolymer.

2. A solvent based, thermosetting coating composition in accordance with claim 1 wherein said lactone monomers polymerized to form said epoxy-polyester graft copolymer have the general formula:

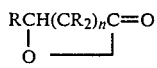

wherein n is at least 4, at least n+2 R's are H and the remaining R's are substituents selected from the group consisting of alkyl, cycloalkyl, alkoxy and single ring aromatic hydrocarbon radicals.

3. A solvent based, thermosetting coating composition in accordance with claim 2 wherein said lactone monomers polymerized to form said epoxy-polyester graft copolymer are epsilon-caprolactone monomers having the general formula:

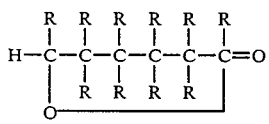

wherein at least 6 of the R's are hydrogen and the remainder are selected from the group consisting of alkyl, cycloalkyl, alkoxy and single ring aromatic hydrocarbon radicals, wherein none of the substituents contain more than about 12 carbon atoms and wherein the total number of carbon atoms in the substituents on a lactone ring does not exceed about 12.

4. A solvent based, thermosetting coating composition in accordance with claim 3 wherein said lactone monomers comprise unsubstituted epsilon-caprolactone.

5. A solvent based, thermosetting coating composition in accordance with claim 2 wherein said epoxy-polyester graft copolymer is formed by polymerization of said lactone monomers in the presence of a catalyst.

6. A solvent based, thermosetting coating composition in accordance with claim 1 wherein said hydroxy functional secondary amines employed in the preparation of said hydroxy functional epoxy ester resin precursor have the general formula:

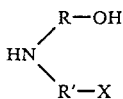

wherein R and R' are selected from aliphatic, cycloaliphatic and aromatic radicals which will not interfere with either the chain termination reaction of the diepoxide and the hydroxy functional secondary amine to form the hydroxy functional epoxy ester resin precursor of said lactone polymerization, and wherein X is selected from the group consisting of hydrogen and hydroxyl radical.

7. A solvent based, thermosetting coating composition in accordance with claim 6 wherein said hydroxy functional secondary amines employed in the preparation of said hydroxyl functional epoxy ester resin precursor bear primary hydroxyl functionality.

8. A solvent based, thermosetting coating composition in accordance with claim 7 wherein said hydroxy functional secondary amines employed in the preparation of said hydroxy functional epoxy ester resin precursor are selected from the group consisting of diethanol amine, methylethanol amine, dipropanol amine and methylpropanol amine.

9. A solvent based, thermosetting coating composition in accordance with claim 1 wherein said chain extended diepoxide employed in the preparation of said hydroxy functional epoxy ester resin precursor is formed by chain extending with dicarboxylic acid diepoxide selected from the group consisting of bisphenol-A epichlorohydrin epoxy resin, hydantoin epoxy resin, cyclic and acyclic aliphatic diepoxides, and mixtures thereof.

10. A solvent based, thermosetting coating composition in accordance with claim 1 wherein said dicarboxylic acid used to chain extend acid diepoxide is selected from the group consisting of saturated or unsaturated, cyclic or acyclic, aliphatic or aromatic dicarboxylic acids and mixtures thereof.

11. A solvent based, thermosetting coating composition in accordance with claim 10 wherein said dicarboxylic acid is of the general formula:

HOOC-R-COOH wherein R is a divalent, linking moiety substantially unreactive with the epoxy functionality of said diepoxide.

12. A solvent based, thermosetting coating composition in accordance with claim 11 wherein R is selected from the group consisting of straight or branched alkylene or alkylidene moieties of about 4 to about 42 carbons and the like and mixtures thereof.

13. A solvent based, thermosetting coating composition in accordance with claim 1 wherein said dicarboxylic acid used to chain extend said diepoxide is selected from the group consisting of substantially saturated, acyclic, aliphatic dimer acids of about 4–42 carbons.

14. A solvent based, thermosetting coating composition in accordance with claim 1 wherein:

(a) said lactone monomers which are polymerized to form said epoxy-polyester graft copolymer have the general formula:

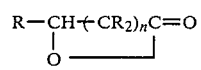

wherein n is at least 4, at least n+2 R's are hydrogen, and the remaining $R_3$ s are substituents selected from the group consisting of alkyl, cycloalkyl, alkoxy and single ring aromatic hydrocarbon radicals;

(b) said polymerization of said lactone monomers to form said epoxy-polyester graft copolymer is carried out in the presence of a catalyst;

(c) said hydroxy functional secondary amines have the general formula:

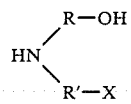

wherein R and R' are selected from the group consisting of aliphatic, cycloaliphatic and aromatic radicals which will not interfere with either the chain termination reaction of epoxide and the hydroxy functional secondary amine or said polymerization of said lactone monomers, X is selected from the group consisting of hydrogen and hydroxyl group, and at least a portion of hydroxyl groups on said hydroxy functional secondary amine are primary; and (d) said chain extended diepoxide is formed by chain extending diepoxide selected from the group consisting of bisphenol-A epichlorohydrin epoxy resin, hydantoin epoxy resin, cyclic and acyclic aliphatic diepoxide, and mixtures thereof with dicarboxylic acid selected from the group consisting of substantially saturated, acyclic, aliphatic dimer acids of about 4–42 carbons and mixtures thereof.

15. A solvent based, thermosetting coating composition in accordance with claim 1 wherein said blocked polyisocyanate is selected from the group consisting of blocked aliphatic, aromatic, cycloalkylene, aliphatic aromatic and nuclear substituted aromatic polyisocyanates and compatible mixtures thereof.

16. A solvent based, thermosetting coating composition in accordance with claim 1 wherein said blocked polyisocyanate crosslinking agent comprises blocked polymethylene polyphenol isocyanate which prior to blocking has the formula:

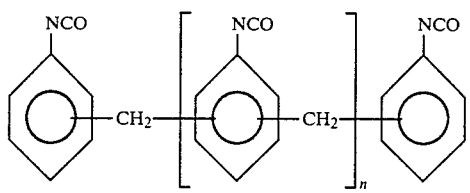

wherein n equals 1 to 3.

17. A solvent based, thermosetting coating composition in accordance with claim 1 wherein the polyisocyanate employed in the preparation of said blocked polyisocyanate crosslinking agent comprises isocyanurate ring containing polyisocyanate prepared by cyclotrimerization of diisocyanate.

18. A solvent based, thermosetting coating composition in accordance with claim 17 wherein said blocked polyisocyanate crosslinking agent consists essentially of blocked trifunctional isocyanurate represented by the formula:

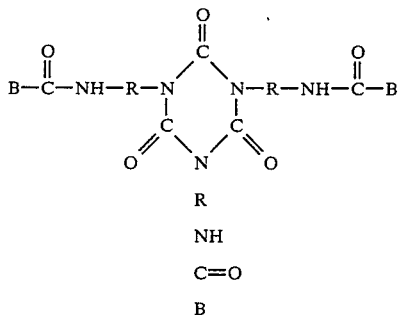

wherein R is selected from the group consisting of aliphatic, cycloaliphatic and aromatic radicals and combinations thereof and B is the residue of said active hydrogen bearing blocking agent.

19. A solvent based, thermosetting coating composition in accordance with claim 1 wherein said polyisocyanate employed in the preparation of said blocked polyisocyanate crosslinking agent comprises an isocyanate terminated polymer prepared by reacting polyols with an excess of polyisocyanate.

20. A solvent based, thermosetting coating composition in accordance with claim 1 wherein said blocked polyisocyanate crosslinking agent is prepared by
(A) reacting (i) organic diisocyanate represented by the formula

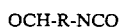

OCH-R-NCO wherein R is selected from the group consisting of aliphatic, cycloaliphatic and aromatic radicals and combinations thereof and wherein one of the isocyanate groups thereof is more reactive than the other and (ii) sufficient active hydrogen containing blocking agent represented by the formula BH to react with substantially all of said more reactive isocyanato groups; and
(B) reacting the reaction product of (A) with sufficient polyol to react with the remaining isocyanato groups.

21. A solvent based, thermosetting coating composition in accordance with claim 20 wherein said polyol is selected from oligoester diols and triols which (i) have a number average molecular weight (Mn) of between about 150 and about 3,000 and (ii) are formed by esterification reaction between a carboxylic acid and an epoxide, said esterification reaction products being selected from the group consisting of the esterification reaction product of:
(a) polycarboxylic acid and monoepoxide;
(b) polyepoxide and monocarboxylic acid containing no ethylenical unsaturation and bearing no hydroxy functionality;
(c) hydroxy functional carboxylic acid and monoepoxide;
(d) monocarboxylic acid and hydroxy functional monoepoxide; and
(e) mixtures of (a)-(d).

22. A solvent based, thermosetting coating composition in accordance with claim 1, adapted to be used as a high solids primer, wherein the solids level of the composition is in the range of 50–60% by weight.

23. A solvent based, thermosetting coating composition in accordance with claim 1, adapted to be used as a chip resistant primer to be sprayed at elevated temperature, wherein the solids level of the composition is in the range of 60–80% by weight.

24. A novel, organic solvent based, thermosetting coating composition comprising:
I. Epoxy-polyester graft copolymer having a number average molecular weight (Mn) of between about 2,000 and about 20,000, said copolymer being prepared by polymerization of epsilon-caprolactone monomers in the presence of an hydroxy functional epoxy ester resin precursor having a number average molecular weight (Mn) of between about 1,000 and about 4,000 and being formed by reacting diepoxide selected from the group consisting of bisphenol-A epichlorohydrin epoxy resin, hydantoin epoxy resin, cyclic and acyclic aliphatic diepoxide, and mixtures thereof, which has been chain extended with dicarboxylic acid consisting of essentially of the dimerization product of C-18 fatty acid, with hydroxy functional secondary amine bearing primary hydroxyl groups in chain terminating reaction in approximately 1 to 1 equivalent ratio, wherein said polymerization of said epsilon-caprolactone is carried out at a temperature between about 130° C. and about 200° C. and the polymerization reaction mixture comprises between about 10 and about 80 weight percent said hydroxy functional epoxy ester resin precursor and between about 20 and about 90 weight percent said lactone monomers; and
II. Blocked polyisocyanate crosslinking agent comprising at least one isocyanate group which has been blocked by reaction with an active hydrogen bearing blocking agent, said blocked polyisocyanate being selected from blocked aliphatic, aromatic, cycloalkylene, aliphatic aromatic, and nuclear substituted aromatic polyisocyanates and being included in said composition in an amount such that upon de-blocking of the blocked isocyanato groups thereof at the cure temperature of the composition, said crosslinking agent will provide between about 0.5 and about 1.6 reactive isocyanate groups per reactive group on said epoxy ester resin.

* * * * *